United States Patent
Jakobsen et al.

(10) Patent No.: US 12,110,248 B2
(45) Date of Patent: Oct. 8, 2024

(54) METHOD OF FIBER PRODUCTION

(71) Applicant: NKT Photonics A/S, Birkerød (DK)

(72) Inventors: Christian Jakobsen, Virum (DK);
Harald Roager Simonsen, Lejre (DK);
Jens Kristian Lyngsøe, Hornbæk (DK);
Mattia Michieletto, Copenhagen (DK)

(73) Assignee: NKT Photonics A/S, Birkerød (DK)

( * ) Notice: Subject to any disclaimer, the term of this patent is extended or adjusted under 35 U.S.C. 154(b) by 193 days.

(21) Appl. No.: 16/096,878

(22) PCT Filed: Apr. 27, 2017

(86) PCT No.: PCT/DK2017/050127
§ 371 (c)(1),
(2) Date: Oct. 26, 2018

(87) PCT Pub. No.: WO2017/186246
PCT Pub. Date: Nov. 2, 2017

(65) Prior Publication Data
US 2019/0135679 A1    May 9, 2019

(30) Foreign Application Priority Data

Apr. 27, 2016 (DK) .......................... PA 2016 70262
Apr. 27, 2016 (DK) .......................... PA 2016 70263

(51) Int. Cl.
*C03B 37/012* (2006.01)
*C03B 37/025* (2006.01)
(Continued)

(52) U.S. Cl.
CPC ...... *C03B 37/0122* (2013.01); *C03B 37/0253* (2013.01); *C03B 37/02781* (2013.01);
(Continued)

(58) Field of Classification Search
CPC ............ C03B 37/0122; C03B 37/0253; C03B 37/02781; C03B 37/1208; C03B 2203/16;
(Continued)

(56) References Cited

U.S. PATENT DOCUMENTS 3,990,874 A * 11/1976 Schulman ............. C03B 37/028
65/393
4,551,162 A * 11/1985 Hicks, Jr. ................ C03B 23/07
385/126
(Continued)

FOREIGN PATENT DOCUMENTS

CN    1269020 A    10/2000
CN    1649801 A    8/2005
(Continued)

OTHER PUBLICATIONS

Toshifumi (JP 2004-339004; English language machine translation provided by ESP@CENET, accessed on Jan. 31, 2021).*
(Continued)

*Primary Examiner* — Lisa L Herring
(74) *Attorney, Agent, or Firm* — Hamilton, Brook, Smith & Reynolds, P.C.

(57) ABSTRACT

A method of producing a microstructured optical fiber is disclosed. The method includes providing a preform and drawing the preform. The preform has a center axis, a length and a first end and a second end and has at least one longitudinal hole extending lengthwise. The method includes inserting a first end of a pressure tube into the hole of the preform at the first end of the preform and subjecting the hole of the preform to a controlled pressure via the pressure tube during the drawing.

13 Claims, 5 Drawing Sheets

(51) Int. Cl.
  *C03B 37/027* (2006.01)
  *G02B 6/02* (2006.01)
(52) U.S. Cl.
  CPC ..... *G02B 6/02295* (2013.01); *G02B 6/02314* (2013.01); *C03B 2203/16* (2013.01); *C03B 2203/42* (2013.01); *C03B 2205/10* (2013.01); *C03B 2205/12* (2013.01)
(58) Field of Classification Search
  CPC ............ C03B 2203/42; C03B 2205/12; C03B 37/02789
  See application file for complete search history.

(56) References Cited

U.S. PATENT DOCUMENTS

| | | | |
|---|---|---|---|
| 4,575,181 A | 3/1986 | Ishikawa | |
| 4,737,011 A | 4/1988 | Iri et al. | |
| 5,018,821 A | 5/1991 | Kurata | |
| 5,210,816 A | 5/1993 | Iino et al. | |
| 5,291,570 A | 3/1994 | Filgas et al. | |
| 5,960,139 A | 9/1999 | Henning | |
| 6,334,019 B1 | 12/2001 | Birks et al. | |
| 6,347,178 B1 | 2/2002 | Edwards et al. | |
| 6,795,635 B1* | 9/2004 | Fajardo | C03B 37/0122 385/100 |
| 6,888,992 B2* | 5/2005 | Russell | G02B 6/02371 385/125 |
| 6,892,018 B2 | 5/2005 | Libori et al. | |
| 6,954,574 B1 | 10/2005 | Russell et al. | |
| 6,985,661 B1 | 1/2006 | Russell et al. | |
| 7,242,835 B2 | 7/2007 | Busse et al. | |
| 7,306,376 B2 | 12/2007 | Scerbak et al. | |
| 7,321,712 B2 | 1/2008 | Williams et al. | |
| 7,373,062 B2 | 5/2008 | Huber | |
| 7,792,408 B2 | 9/2010 | Varmimg | |
| 7,793,521 B2 | 9/2010 | Gallagher et al. | |
| 8,215,129 B2 | 7/2012 | Russell et al. | |
| 8,306,379 B2 | 11/2012 | Benabid et al. | |
| 8,393,804 B2 | 3/2013 | Nielson et al. | |
| 8,854,728 B1 | 10/2014 | Brooks et al. | |
| 8,938,146 B2 | 1/2015 | Lyngsoe et al. | |
| 10,139,560 B2 | 11/2018 | Poletti et al. | |
| 10,527,782 B2 | 1/2020 | Lyngsøe et al. | |
| 10,551,574 B2 | 2/2020 | Alkeskjold et al. | |
| 10,989,866 B2 | 4/2021 | Lyngsøe et al. | |
| 11,002,919 B2 | 5/2021 | Alkeskjold et al. | |
| 11,072,554 B2 | 7/2021 | Simonsen et al. | |
| 11,360,274 B2 | 6/2022 | Alkeskjold et al. | |
| 11,474,293 B2 | 10/2022 | Lyngsøe et al. | |
| 11,662,518 B2 | 5/2023 | Jakobsen | |
| 11,846,809 B2 | 12/2023 | Alkeskjold et al. | |
| 11,977,255 B2 | 5/2024 | Lyngsøe et al. | |
| 2002/0118938 A1* | 8/2002 | Hasegawa | G02B 6/29376 385/125 |
| 2002/0159734 A1 | 10/2002 | Sasaoka et al. | |
| 2003/0068150 A1 | 4/2003 | Ariel et al. | |
| 2003/0230118 A1* | 12/2003 | Dawes | C03B 37/02781 65/379 |
| 2005/0185908 A1 | 8/2005 | Roberts et al. | |
| 2005/0232560 A1 | 10/2005 | Knight et al. | |
| 2005/0233301 A1 | 10/2005 | Berd et al. | |
| 2005/0238301 A1 | 10/2005 | Russel et al. | |
| 2005/0286847 A1 | 12/2005 | Arimondi et al. | |
| 2006/0130528 A1 | 6/2006 | Nelson et al. | |
| 2006/0193583 A1 | 8/2006 | Dong et al. | |
| 2007/0009216 A1 | 1/2007 | Russell et al. | |
| 2007/0204656 A1* | 9/2007 | Gallagher | C03B 37/02781 65/379 |
| 2007/0237453 A1 | 10/2007 | Nielsen et al. | |
| 2007/0292087 A1 | 12/2007 | Brown | |
| 2008/0310806 A1 | 12/2008 | Mukasa | |
| 2009/0252459 A1 | 10/2009 | Nielson et al. | |
| 2009/0320526 A1 | 12/2009 | Carberry et al. | |
| 2010/0124393 A1 | 5/2010 | Li et al. | |
| 2010/0132406 A1 | 6/2010 | Huenermann | |
| 2010/0135616 A1 | 6/2010 | Watte et al. | |
| 2010/0303429 A1* | 12/2010 | Gibson | G02B 6/02314 385/125 |
| 2010/0326139 A1 | 12/2010 | Sugizaki et al. | |
| 2011/0013652 A1 | 1/2011 | Knight et al. | |
| 2011/0194816 A1 | 8/2011 | Kumkar et al. | |
| 2011/0195515 A1* | 8/2011 | Beat | B01L 3/06 422/68.1 |
| 2012/0141079 A1 | 6/2012 | Gibson et al. | |
| 2013/0208737 A1 | 8/2013 | Clowes et al. | |
| 2014/0029896 A1 | 1/2014 | Zheng et al. | |
| 2014/0211818 A1 | 7/2014 | Hou | |
| 2015/0192732 A1 | 7/2015 | Moselund | |
| 2017/0097464 A1 | 4/2017 | Challener et al. | |
| 2017/0160467 A1* | 6/2017 | Poletti | G02B 6/02328 |
| 2018/0267235 A1* | 9/2018 | Russell | G02B 6/02328 |
| 2018/0339931 A1* | 11/2018 | Simonsen | G02B 6/032 |
| 2018/0372961 A1 | 12/2018 | Alkeskjold et al. | |
| 2019/0011634 A1* | 1/2019 | Lyngsoe | G02B 6/02328 |
| 2019/0101695 A1 | 4/2019 | Poletti et al. | |
| 2020/0103587 A1* | 4/2020 | Lyngsoe | G02B 6/02328 |
| 2020/0166699 A1* | 5/2020 | Bauerschmidt | G02B 6/2552 |
| 2020/0310039 A1 | 10/2020 | Alkeskjold et al. | |
| 2021/0323856 A1 | 10/2021 | Simonsen et al. | |
| 2021/0341682 A1 | 11/2021 | Alkeskjold et al. | |
| 2022/0011501 A1 | 1/2022 | Lyngsøe et al. | |
| 2022/0269012 A1 | 8/2022 | Alkeskjold et al. | |
| 2023/0018465 A1 | 1/2023 | Lyngsøe et al. | |
| 2023/0185019 A1 | 6/2023 | Campbell et al. | |
| 2023/0273366 A1 | 8/2023 | Lyngsøe et al. | |
| 2024/0053545 A1 | 2/2024 | Alkeskjold et al. | |
| 2024/0201434 A1 | 6/2024 | Lyngsøe et al. | |

FOREIGN PATENT DOCUMENTS

| | | | |
|---|---|---|---|
| CN | 101122651 A | 2/2008 | |
| CN | 101210977 A | 7/2008 | |
| CN | 101426743 A | 5/2009 | |
| CN | 101779149 A | 7/2010 | |
| CN | 102066996 A | 5/2011 | |
| CN | 201845110 U | 5/2011 | |
| CN | 102815864 A | 12/2012 | |
| CN | 103823277 A | 5/2014 | |
| CN | 104078124 A | 10/2014 | |
| CN | 104297839 A | 1/2015 | |
| CN | 104568841 A | 4/2015 | |
| EP | 1096285 A2 | 5/2001 | |
| EP | 1495260 B1 | 9/2008 | |
| EP | 2322489 A1 | 5/2011 | |
| EP | 2 479 594 A1 | 7/2012 | |
| EP | 2533081 A1 | 12/2012 | |
| EP | 3374322 A1 | 9/2018 | |
| GB | 2 097 149 A | 10/1982 | |
| GB | 2 255 199 A | 10/1992 | |
| GB | 2387666 A | 10/2003 | |
| GB | 2518420 A | 3/2015 | |
| JP | S62178203 A | 8/1987 | |
| JP | 64-86104 A | 3/1989 | |
| JP | 01-086104 U | 6/1989 | |
| JP | H052118 A | 1/1993 | |
| JP | H07-92355 A | 4/1995 | |
| JP | 2000180660 A | 6/2000 | |
| JP | 2001-086104 A | 3/2001 | |
| JP | 2001-166176 A | 6/2001 | |
| JP | 2001318244 A | 11/2001 | |
| JP | 2002-506533 A | 2/2002 | |
| JP | 2002-323625 A | 11/2002 | |
| JP | 2003-107294 A | 4/2003 | |
| JP | 2003107281 A | 4/2003 | |
| JP | 2003-279758 A | 10/2003 | |
| JP | 2004077979 A | 3/2004 | |
| JP | 2004-191947 A | 7/2004 | |
| JP | 2004339004 A * | 12/2004 | ....... C03B 37/02781 |
| JP | 2005043638 A | 2/2005 | |
| JP | 2006-39147 A | 2/2006 | |
| JP | 2006-276882 A | 10/2006 | |
| JP | 2008020741 A | 1/2008 | |
| JP | 2009007201 A * | 1/2009 | ......... C03B 37/0253 |

(56) References Cited

FOREIGN PATENT DOCUMENTS

| | | | |
|---|---|---|---|
| JP | 2009116193 A | 5/2009 | |
| JP | 2009528248 A | 8/2009 | |
| JP | 2010215458 A | 9/2010 | |
| JP | 201845110 U | 5/2011 | |
| JP | 2011-107687 A | 6/2011 | |
| JP | 2011526704 A | 10/2011 | |
| JP | 2011232706 A | 11/2011 | |
| JP | 2012-036052 A | 2/2012 | |
| JP | 2019-504350 A | 2/2019 | |
| WO | 99 00685 A1 | 1/1999 | |
| WO | 99/35524 A2 | 7/1999 | |
| WO | 01/46734 A1 | 6/2001 | |
| WO | 03/078338 A2 | 9/2003 | |
| WO | 03/080524 A1 | 10/2003 | |
| WO | 03/87666 A1 | 10/2003 | |
| WO | 2004/083918 A1 | 9/2004 | |
| WO | 2004/083919 A1 | 9/2004 | |
| WO | 2005/012197 A2 | 2/2005 | |
| WO | 2005/091029 A2 | 9/2005 | |
| WO | 2006/072025 A2 | 7/2006 | |
| WO | 2007/106305 A2 | 9/2007 | |
| WO | 2009/010317 A1 | 1/2009 | |
| WO | 2009/157977 A1 | 12/2009 | |
| WO | 2010084964 A1 | 7/2010 | |
| WO | 2012/168400 A1 | 12/2012 | |
| WO | 2013/168400 A1 | 11/2013 | |
| WO | 2013168400 A2 | 11/2013 | |
| WO | 2015/003714 A1 | 1/2015 | |
| WO | 2015/003715 A1 | 1/2015 | |
| WO | 2015/144181 A1 | 10/2015 | |
| WO | 2015/185761 A1 | 12/2015 | |
| WO | 2017/080564 A1 | 5/2017 | |
| WO | 2017/108060 A1 | 6/2017 | |
| WO | 2017108061 A1 | 6/2017 | |

OTHER PUBLICATIONS

JP-2009007201-A Google Machine Translation Performed Oct. 6, 2023. (Year: 2023).*

Extended European Search Report issued on Jul. 9, 2019 in European Patent Application No. 16877822.3-1003, 12 pages.

Search Report mailed on Jun. 30, 2016 in corresponding Danish Patent Application No. 2015 70877, 4 pages.

Extended European Search Report issued on May 28, 2019 in European Patent Application No. 16863710.6, 8 pages.

Written Opinion issued on Oct. 4, 2019 in corresponding Singapore Patent Application No. 11201804707Y, 8 pages.

Office Action (First Office Action) issued on Oct. 12, 2019 in the corresponding Chinese patent Application No. 201680075502.8, 29 pages.

Office Action (Second Office Action) issued on Apr. 8, 2020 in the corresponding Chinese patent Application No. 201680075502.8, 7 pages.

Office Action (First Office Action) issued on Oct. 8, 2019 in the corresponding Chinese patent application No. 201680075508.5, 13 pages.

Office Action (Second Office Action) issued on Jun. 9, 2020 in the corresponding Chinese patent Application No. 201680075508.5, 12 pages.

Extended European Search Report issued on Jul. 23, 2019 in the corresponding European patent application No. 16877821.5, 11 pages.

Extended European Search Report issued on Jul. 9, 2019 in the corresponding European patent application No. EP16877822.3, 11 pages.

Office Action issued on Jun. 17, 2020 in the corresponding European patent application No. 16877822.3, 7 pages.

Written Opinion issued on Oct. 10, 2019 in the corresponding Singapore patent application No. 112018038381T, 8 pages.

Written Opinion issued on Oct. 7, 2019 in the corresponding Singapore patent application No. 11201804738S, 8 pages.

Office Action (First Office Action) issued on Sep. 8, 2020 by the China National Intellectual Property Administration in corresponding Chinese Patent Application No. 201680078462.2 and an English Translation of the Office Action. (43 pages).

Office Action (Communication pursuant to Article 94(3) EPC) issued on Oct. 10, 2020, by the European Patent Office in corresponding European Application No. 16 863 710.6-1105. (5 pages).

Office Action issued on Nov. 19, 2020, by the Japanese Patent Office in corresponding Japanese Patent Application No. 2018-532357, and an English Translation of the Office Action. (15 pages).

Office Action issued on Nov. 24, 2020, by the Japanese Patent Office in corresponding Japanese Patent Application No. 2018-532462, (6 pages).

Examination Report issued on Sep. 8, 2020 by the Intellectual Property Office of Singapore in corresponding Singapore Patent Application No. 11201804738S, (4 pages).

Office Action (Non-Final) issued by the U.S. Patent and Trademark Office in the U.S. Appl. No. 15/774,780 mailed Aug. 28, 2020, U.S. Patent and Trademark Office, Alexandria, VA. (26 pages).

Office Action (The First Office Action) issued on Apr. 12, 2021, by the State Intellectual Property Office of the People's Republic of China in corresponding Chinese Patent Application No. 201780039576.0, and an English Translation of the Office Action. (20 pages).

Office Action (Notification of the First Office Action) issued on Apr. 12, 2021, by the China National Intellectual Property Administration in corresponding Chinese Patent Application No. 201780039576.0, and an English Translation of the Office Action. (13 pages).

U.S. Appl. No. 17/213,653, Jens Kristian Lyngsøe, Mar. 26, 2021.

Notice of Allowance dated Jun. 14, 2022, issued in the corresponding Japanese Patent Application No. 2018-532357, with English Translation, 8 pages.

Notification of Reasons for Rejection dated Apr. 19, 2022, issued in the corresponding Japanese Patent Application No. 2018-532462, with English Translation, 11 pages.

Extended European Search Report dated Dec. 4, 2019, issued by the European Patent Office in corresponding European Application No. 17788848.4-1105, (8 pages).

International Search Report (PCT/ISA/210) mailed on Mar. 3, 2017, by the Denmark Patent Office as the International Searching Authority for International Application No. PCT /DK2016/050460.

Written Opinion (PCT/ISA/237) mailed on Mar. 3, 2017, by the Denmark Patent Office as the International Searching Authority for International Application No. PCT /DK2016/050460.

Search Report issued on Jun. 3, 2018, by the Danish Patent and Trademark Office in corresponding Application No. PA 2015 70724. (5 pages).

Sorensen T. et al.",Metal-assisted coupling to hollow-core photonic crystal fibres" Electronics Letters, vol. 41 No. 12, Jun. 9, 2005, 2 pages.

Vincetti L. et al."Waveguiding mechanism in tube lattice fibers" vol. 18, No. 22, Optics Express, Oct. 25, 2010, 14 pages.

Habib Md. S. et al."Low-loss hollow-core silica fibers with adjacent nested anti-resonant tubes" vol. 23, No. 13, Optics Express, Jun. 24, 2015, 13 pages.

Belardi W. "Design and properties of hollow antiresonant fibers for the visible and near infrared spectral range" arXiv (Jan. 2015); doi: 10.1364/OE.23.017394.

Kolyadin A. et al., "Light transmission in negative curvature hollow core fiber in extremely high material loss region," Opt. Express vol. 21, No. 8, 9514-9519, Apr. 10, 2013, 6 pages.

Günendi M. C. et al."Broad-band robustly single-mode hollow-core PCF by resonant filtering of higher order modes" 7 pages.

Poletti F. "Nested antiresonant nodeless hollow core fiber" vol. 22, No. 20, Opt. Express, Sep. 22, 2014, 22 pages.

Kolyadin A. N. et al."Negative curvature hollow-core fibers: dispersion properties and femtosecond pulse delivery" Elsevier— Physics Procedia, vol. 73, 2015, pp. 59-66.

Search Report and Written Opinion mailed on Jun. 30, 2016 by the Danish Patent and Trademark Office in corresponding Application No. PA 2015 70877, 7 pages.

Search Report and Search Opinion issued on Jun. 2, 2016, by Danish Patent and Trademark Office in corresponding Application No. PA 2015 70876, 6 pages.

(56) References Cited

OTHER PUBLICATIONS

International Search Report (Form PCT/ISA/210) issued on Jun. 30, 2017, by the Danish Patent Office in corresponding International Application No. PCT/DK2017/050127. (8 pages).
Written Opinion of the International Searching Authority (PCT/ISA/237) mailed on Jun. 30, 2017, by the Danish Patent Office for the International Application No. PCT/DK2017/050127. (10 pages).
U.S. Appl. No. 17/942,709, Jens Kristian Lyngsøe, Sep. 12, 2022.
Office Action (Notice of Second Review Opinion) issued on Oct. 8, 2021, by the State Intellectual Property Office in corresponding Chinese Patent Application No. 201780039576.0, and an English Translation of the Office Action. (14 pages).
Belardi et al., "Hollow Antiresonant Fibers with Low Bending Loss", Optics Express, vol. 22, No. 8, 2014, 6 pages.
Belardi W, et al., "Design and properties of hollow antiresonant fibers for the visible and near infrared spectral range", doi: 10.1364/OE.23.017394, Jan. 2015.
Extended European Search Report issued on May 6, 2022, by the European Patent Office in European Patent Application No. 22153290.6. (9 pages).
Final Office Action for U.S. Appl. No. 17/356,620 entitled Element for a Preform, A Fiber Production Method and an Optical Fiber Drawn From the Preform, date mailed Jun. 1, 2023.
International Search Report and Written Opinion received for PCT Patent Application No. PCT/DK2016/050364, mailed on Feb. 10, 2017, 20 pages.
International Search Report and Written Opinion received for PCT Patent Application No. PCT/DK2016/050459, mailed on Feb. 28, 2017, 20 pages.
Invitation to Written Opinion dated Dec. 28, 2020, by the Intellectual Property Office of Singapore in corresponding Singapore Patent Application No. 11201803838T, (6 pages).
Monro, Microstructured Optical Fibers, Guided Wave Optical Components and Devices, Chapter 3, 41-70, 2006.
Non-Final Office Action received for U.S. Appl. No. 17/744,401, mailed on Apr. 13, 2023, 6 pages.
Notice of Allowance (Decision to Grant a Patent) issued on Jan. 25, 2022, in Japanese Patent Application No. 2018-523498 and an English Translation of the Notice of Allowance. (8 pages).
Notice of Allowance received for U.S. Appl. No. 17/744,401, mailed on Jul. 28, 2023, 7 pages.
Office Action (Communication pursuant to Article 94(3) EPC) dated Aug. 12, 2020, by the European Patent Office in corresponding European Application No. 16 877 821.5-1001, 6 pages.
Office Action (Communication pursuant to Article 94(3) EPC) dated Aug. 4, 2021 by the European Patent Office in corresponding European Application No. 16 877 822.3-1001. (6 pages).
Office Action (Communication pursuant to Article 94(3) EPC) dated Jun. 16, 2023, by the European Patent Office in corresponding European Application No. 17788848.4 6 pages.
Office Action (Communication pursuant to Article 94(3) EPC) dated Oct. 5, 2020, by the European Patent Office in corresponding European Application No. 16 863 710.6-1105. (5 pages).
Office Action (Communication pursuant to Article 94(3) EPC) issued on Feb. 2, 2023, by the European Patent Office in corresponding European Application No. 16 863 710.6-1105, (4 pages).
Office Action (Decision of Rejection) dated Jul. 22, 2023, by the State Intellectual Property Office in corresponding Chinese Patent Application No. 202110941422.9, and an English Translation of the Office Action.
Office Action (Decision of Rejection) dated Jul. 22, 2023, by the State Intellectual Property Office in corresponding Chinese Patent Application No. 202110941824.9, and an English Translation of the Office Action.
Office Action (Decision of Rejection) issued on Aug. 10, 2021, by the Japanese Patent Office in corresponding Japanese Patent Application No. 2018-523498, with English Translation (9 pages).
Office Action (Decision of Rejection) issued on Nov. 2, 2021, by the Japanese Patent Office in corresponding Japanese Patent Application No. 2018-532462, and an English Translation of the Office Action. (11 pages).
Office Action (Examination Report) dated Jul. 16, 2020, by the Intellectual Property Office of Singapore in corresponding Singapore Application No. 11201804707Y, 3 pages.
Office Action (First Office Action) issued on Jan. 5, 2023, by the State Intellectual Property Office in corresponding Chinese Patent Application No. 202110941422.9, and an English Translation of the Office Action. (23 pages).
Office Action (First office Action) issued on Jan. 5, 2023, by the State Intellectual Property Office in corresponding Chinese Patent Application No. 202110941824.9 and an English Translation of the Office Action. (22 pages).
Office Action (Notice of Reasons for Refusal) dated Mar. 1, 2022, by the Japanese Patent Office in corresponding Japanese Patent Application No. 2018-532357, and an English Translation of the Office Action. (6 pages).
Office Action (Notice of Reasons for Refusal) dated Oct. 28, 2021, by the Japanese Patent Office in corresponding Japanese Patent Application No. 2018-532357, and an English Translation of the Office Action. (12 pages).
Office Action (Notice of Reasons for Rejection) dated Dec. 8, 2020, by the Japanese Patent Office in corresponding Japanese Patent Application No. 2018-523498, and an English Translation of the Office Action. (7 pages).
Office Action (Notice of Second Review Opinion) issued on Oct. 8, 2021, by the State Intellectual Property Office in Corresponding Chinese Patent Application No. 201780039576.0, and an English Translation of the Office Action. (10 pages).
Office Action (Notification of Reasons for Rejection) issued on Apr. 4, 2023, by the Japanese Patent Office in corresponding Japanese Patent Application No. 2022-030754, and an English Translation of the Office Action. (12 pages).
Office Action (Second Office Action) issued on Jul. 26, 2021 by the China National Intellectual Property Administration in corresponding Chinese Patent Application No. 201680078462.2, and an English Translation of the Office Action. (15 pages).
Office Action (Second Office Action) issued on Sep. 5, 2023, by the Japanese Patent Office in corresponding Japanese Patent Application No. 2022-030754.
Office Action (The Third Office Action) issued on Dec. 14, 2021, by the State Intellectual Property Office of the People's Republic of China in corresponding Chinese Patent Application No. 201680078462.2, and an English Translation of the Office Action. (7 pages).
Office Action dated Dec. 1, 2020, by the Japanese Patent Office in corresponding Japanese Application No. 2018-532357, with English Translation. (15 pages).
Office Action dated Oct. 28, 2020, by the Sate Intellectual Property Office of the People's Republic of China (National Chizawa Bureau) in corresponding Chinese Patent Application No. 201680075508.5 and an English translation of the Office Action. (6 pages).
Office Action dated Oct. 28, 2020, by the Sate Intellectual Property Office of the People's Republic of China (National Chizawa Bureau) in corresponding Chinese Patent Application No. 201680075508.5 in English. (4 pages).
Office Action issued on Dec. 19, 2022, by the Canadian Intellectual Property Office in Canadian Patent Application No. 3,008,053 (6 pages).
Office Action issued on Jan. 11, 2023, by the Canadian Intellectual Property Office in Canadian Patent Application No. 3,008,919, (5 pages).
Office Action issued on Nov. 4, 2022, by the Canadian Intellectual Property Office in Canadian Patent Application No. 3,004,945 (3 pages).
The extended European Search Report dated Jul. 9, 2019, by the European Patent Office in European Patent Application No. 16877822.3-1003. (12 pages).
Applicant: NKT Photonics A/S, Notice of Preliminary Rejection for Korean Application 10-2018-7020721 mailed Sep. 18, 2023, entitled Photonic Crystal Fiber Assembly, 8 pages.

(56) References Cited

OTHER PUBLICATIONS

English Abstract of First Office Action for Chinese Application No. 202210966063.7, mailed on Jul. 28, 2023.
Notice of Allowance received for U.S. Appl. No. 18/301,648, mailed on Nov. 22, 2023, 9 pages.
U.S. Non-Final Rejection for U.S. Appl. No. 17/356,620, mailed on Oct. 20, 2023.
Final Office Action received for U.S. Appl. No. 17/356,620, mailed on Mar. 21, 2024, 17 pages.
Notice of Allowance and Fee(s) Due for U.S. Appl. No. 18/301,648, Date Mailed Mar. 18, 2024, 12 pages.
Office Action (Non-Final) in U.S. Appl. No. 15/774,780, mailed Jan. 17, 2020.
Non-Final Office Action received for U.S. Appl. No. 18/493,548, mailed on May 2, 2024, 6 pages.
Notice of Allowance received for U.S. Appl. No. 17/356,620, mailed on Jun. 3, 2024, 10 pages.
Notice of Allowance received for U.S. Appl. No. 17/356,620, mailed on Jul. 5, 2024, 3 pages.
Notice of Allowance and Fees Due (PTOL-85) Mailed on Jul. 19, 2024 for U.S. Appl. No. 17/356,620, 3 page(s).
Notice of Allowance received for U.S. Appl. No. 18/493,548, mailed on Jul. 17, 2024, 5 pages.

* cited by examiner

METHOD OF FIBER PRODUCTION

This application is the U.S. National Stage of International Application No. PCT/DK2017/050127, filed on Apr. 27, 2017, which designates the U.S. and published in English. This application claims priority under 35 U.S.C. § 119 or 365 to Denmark Application No. PA 2016 70262, filed on Apr. 27, 2016 and Denmark Application No. PA 2016 70263, filed on Apr. 27, 2016. The entire teachings of the above applications are incorporated herein by reference.

TECHNICAL FIELD

The invention relates to a method of producing a microstructured optical fiber from a preform.

BACKGROUND ART

Microstructured optical fibers comprising one or more holes extending along at least a length section thereof are well known in the art and comprise in particular photonic crystal fibers, in the following referred to as PCF. The microstructured optical fibers are fibers having a core surrounded by a cladding region having a plurality of inclusions (sometimes called cladding features or microstructures) arranged in a background material, typically in a regular array. The inclusion may be gas, liquid, or solid inclusion. In principle the inclusions could be void, but in practice the voids will normally comprise some gas molecules.

The microstructured fiber may for example be of silica glass. Other materials may be added to the silica glass in order to alter the refractive index thereof or to provide effects, such as amplification of light, sensitivity, etc.

Microstructured optical fibers are usually produced by first producing a preform having a desired cross sectional structure and thereafter drawing the fiber from the preform at a suitable temperature ensuring that the material of the preform is sufficiently soft while not fully melted. Such a method is for example described in U.S. Pat. No. 6,954,574. The preform is produced by stacking a number of canes, each having a longitudinal axis, a first end and a second end, at least some of the canes being capillaries each having a hole parallel to the longitudinal axis of the cane and running from the first end of the cane to the second end of the cane. The canes are formed into a stack, where the canes being arranged with their longitudinal axes substantially parallel to each other and to the longitudinal axis of the stack provide the preform. Thereafter the preform is drawn into a fiber whilst maintaining the hole of at least one capillary in communication with a source of fluid at a first pressure whilst maintaining the pressure around the capillary at a second pressure that is different from the first pressure, thereby the hole at the first pressure becomes, during the drawing process, a size different from that which it would have become without the pressure difference.

U.S. Pat. No. 8,215,129 discloses a method of manufacturing a microstructured fiber, comprises: providing a preform comprising a plurality of longitudinal holes; mating at least one, but not all, of the holes with a connector to connect the hole(s) to an external pressure-controller; drawing the preform into the fiber whilst controlling the gas pressure in the hole(s) connected to the pressure-controller. Thereby during drawing of the fiber, the size of individual holes can be controlled by individually addressing each hole in the preform and changing the pressure in that hole. If several holes are addressed simultaneously, then the structure which emerges in the actual fiber can be altered during the drawing process. The connector may comprise a plurality of chambers, each chamber being connectable to an external pressure source and the connector and preform may be arranged so that at least a first one of the longitudinal holes terminate in a first one of the chambers and at least a second one of the longitudinal holes terminate in a second one of the chambers; wherein the preform is arranged to pass through one or more of the chambers such that at least one of the longitudinal holes terminate in a chamber arranged next to a chamber through which the preform passes.

U.S. Pat. No. 7,793,521 discloses a method of fabricating a photonic crystal or photonic band gap optical fiber comprises providing a preform that includes a plurality of holes in an outer diameter, wherein the holes extend from a first end of a preform to a second end of the preform, and forming at least one radially inwardly-extending slot within the preform such that the slot intersects at least some of the holes, wherein the slot does not intersect at least one hole. The method also includes establishing a first pressure in the holes intersected by the slot by introducing the first pressure to the slot, and establishing a second pressure in the at least one hole not intersected by the slot by introducing the second pressure to an end of the at least one hole not intersected by the slot. The method further includes drawing the preform into a fiber while independently controlling the first and second pressures.

DESCRIPTION OF THE INVENTION

In an embodiment it is an object to provide a method of producing a microstructured optical fiber which is relatively simple and offers large freedom in design of the fiber and where the diameter of selected longitudinal holes can be controlled with a high accuracy.

In an embodiment it is an object to provide a method of producing a microstructured optical fiber by which method the pressure in selected longitudinal holes may be controlled independently.

These and other objects have been solved by the invention or embodiments thereof as defined in the claims and as described herein below.

It has been found that the invention or embodiments thereof have a number of additional advantages which will be clear to the skilled person from the following description.

The phrase "radial distance" means distance determined in radial direction perpendicular to the center axis of the element in question e.g. the fiber or the preform. The phrase "radial direction" is a direction from the center axis and radially outwards or a direction radially inwards towards the center axis.

The term "substantially" should herein be taken to mean that ordinary product variances and tolerances are comprised.

The terms "microstructured fibers" and "microstructured optical fibers" are used interchangeably and in this context are meant to cover fibers comprising microstructures such as photonic crystal fibers, photonic band gap fibers, leaky channel fibers, holey fibers, etc. The microstructured optical fiber comprises a core region and a cladding region surrounding the core where the cladding region may have several layers and/or cladding sub regions with different refractive index. Unless otherwise noted, the refractive index refers to the average refractive index which is usually calculated separately for the core region and each cladding layer surrounding it and/or optionally for each cladding sub region. A cladding layer is defined as a layer with a thickness which layer surrounds the core region where the refractive index is substantially homogeneous or where the layer has a base material with a substantially homogeneous refractive index and a plurality of microstructures arranged in a uniform pattern.

The term "longitudinal hole" means an the hole generally extending along the length of the preform or the fiber, such as along the hole length or along a section thereof. The term "hole" means "longitudinal hole" unless anything else is specified.

The term "about" is generally used to include what is within measurement uncertainties. The term "about" when used in ranges, should herein be taken to mean that what is within measurement uncertainties are included in the range.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

Throughout the description or claims, the singular encompasses the plural unless otherwise specified or required by the context.

The terms "core" and "core region" are used interchangeably and the term "cladding" and "cladding region" are used interchangeably.

In an embodiment the method comprises providing a preform and drawing the preform. The preform has a center axis, a length and a first end and a second end and comprises at least one longitudinal hole extending along its length. The method comprises inserting a first end of a pressure tube into the hole of the preform at the first end of the preform and subjecting the hole of the preform to a controlled pressure via the pressure tube during the drawing.

It should be understood that the at least one longitudinal hole is extending lengthwise along the length of the preform and may extend in a part of the preform length or in the entire preform length, optionally with the exception that the holed may be closed at the second end or at a position closer to the second end than the first end. The method has been found to be very simple compared with prior art method while the method simultaneously provides a very accurate control of the pressure within the one or more holes during the drawing. Furthermore the method allows individual control of the pressure in the various holes during drawing, which allows improved control of the final structure of the fiber and of the optical properties of the final optical fiber.

Where the method in the following is described with one pressure controlled hole via a pressure tube, it should be understood that several holes may be subjected to pressure control via respective tubes.

The preform may be any preform comprising at least one longitudinal hole.

The preform may e.g. be of glass, such as silica glass, soft glass chalcogenide glass or any combinations thereof. The glass may comprise index-changing dopants, such as Ge, B, F, P, Al and/or active material dopant, such as the rare-earth elements Er or Yb. The dopant and/or the active may be applied in preferred regions of the preform such as it is known in the art.

In an embodiment the pressure tube is arranged to provide a gas communication between the hole and a pressure supply. The pressure supply ensures that the pressure within the longitudinal hole extending along the length of the preform is controlled to a desired level via the pressure tube.

The pressure tube is advantageously a hollow tube. The phrase "in the tube" refers to in the hollow part of the tube.

The method may comprise drawing the preform to the microstructured optical fiber in one or more drawing steps. At least one of the drawing steps comprises subjecting the hole of the preform to a controlled pressure via the pressure tube during the drawing. The one or more steps may comprise one or more pre-drawing step.

In an embodiment the drawing steps comprises a pre-drawing step, wherein the pre-drawing step comprises subjecting the hole of the preform to a controlled pressure via the pressure tube during the drawing.

Thereby the relative diameter(s) of the at least one hole may be modified prior to a final drawing step.

If for example several holes of a preform is subjected to an increased pressure via pressure tubes in a pre-drawing step the relative diameter(s) may be increased. Other holes may e.g. be relatively reduced in diameter by subjecting such holes to a reduced pressure via other pressure tubes.

In an embodiment the drawing steps comprises a final-drawing step, advantageously, the final-drawing step comprises subjecting the hole of the preform to a controlled pressure via the pressure tube during the drawing.

In an embodiment at least one longitudinal hole is open at the first end of the preform for facilitating insertion of the first end of the pressure tube into the hole. The first end of the pressure tube may simply be inserted into the hole at the first end of the preform and held in position by its connection the pressure source and/or by a holding element, such as a clamp.

According to the invention it has been found that a safe gas connection may be obtained between the longitudinal hole and the pressure tube by simply inserting the first end of the pressure tube into the hole and optionally providing that the pressure tube length section is expanded such that its outer surface fits to the periphery surface of the longitudinal hole and/or applying a sealing material, such as glue, epoxy, grease and/or rubber or any other pliable sealing material.

In an embodiment the method comprises regulating the pressure in the pressure tube such that the pressure tube is self-sealing to said longitudinal hole. It has been found that where the pressure in the pressure tube at least in an initial step is higher than the pressure surrounding the part of the pressure tube not inserted into the hole, the pressure tube may be self-sealing. To ensure an accurate pressure control it is desired that the at least one longitudinal hole is closed at a distance from the first end of the preform. Advantageously the longitudinal hole is closed at a location which is closer to the second end than the first end of the preform. Advantageously and for optimal use of the preform material the longitudinal hole is in an embodiment closed at the second end of the preform.

Advantageously the hole will be closed at the second end of the preform prior to or at the drawing of the fiber. The closing of the hole may e.g. be provided by collapsing the hole or by any other method.

Advantageously the preform is held at a first end section near its first end and the microstructured optical fiber is drawn from the second end of the preform second end at an increased temperature, e.g. as known from prior art fiber drawing methods.

The pressure tube advantageously has an outer diameter and periphery selected such that it fits into the hole. The cross sectional shape of the hole may be round or oval or any other suitable shape. The surface defining the hole is also referred to as the periphery surface of the longitudinal hole. In an embodiment the preform comprises at least one hole with an essentially circular cross sectional shape. In an embodiment the preform comprises at least one hole with a non-circular cross sectional shape. Where the hole has non-circular cross-sectional shape the diameter is determined as the maximum diameter.

The pressure tube preferably has an outer cross sectional shape corresponding to the cross sectional shape of the hole, however with an average diameter slightly smaller than the average diameter of the hole, such that the first end of the pressure tube can be inserted into the hole.

Thus in an embodiment the method comprises inserting a first end of a pressure tube into the hole of the preform at the first end of the preform and subjecting the hole of the preform to a controlled pressure via the pressure tube during drawing. Advantageously at least a pressure tube length section comprising the first end of the pressure tube is inserted into the longitudinal hole. The pressure tube length section should preferably have a length of at least about 0.5 mm, such as of from about 1 mm to about 20 cm, such as from about 2 mm to about 5 cm, such as from 0.5 to 1 cm.

In an embodiment the pressure tube length section, is about 50% or less of an entire pressure tube length.

The term "pressure tube length section" is used to designate the length section of the pressure tube that is inserted into the hole of the preform.

In practice it is desired that the pressure tube length section has a length which is sufficient to provide a seal between the pressure tube length section and the longitudinal hole, and yet it should not be too long since the length part of the preform comprising the pressure tube length section may in an embodiment not be drawn to fiber or if—in an alternative embodiment—it is drawn to fiber, the resulting fiber will have different characteristics than the fiber drawn from preform material without the tube length section(s).

Thus in an embodiment where the pressure tube length section is to be drawn to become part of the fiber it is desired that the longitudinal hole has a length and the pressure tube length section has a length of at least about 50% of the length of the longitudinal hole, such as at least about 80% of the length of the longitudinal hole, such as at least about 90% of the length of the longitudinal hole, such as substantially the length of the longitudinal hole.

Thereby the material of the pressure tube length section may be drawn to become part of the fiber in all or a part of the fiber length.

In an embodiment the method comprises inserting the pressure tube length section into the hole of the preform to provide that the pressure tube length section—namely the material of the pressure tube length section—becomes a part of the preform. By drawing the preform to the microstructured optical fiber such that the microstructured optical fiber comprises at least a part of the pressure tube length section, the material of the pressure tube length section as well as the wall thickness of the pressure tube length section may be applied as parameters for modifying the final optical properties of the microstructured optical fiber.

Thus in an embodiment the pressure tube length section is of a material which differs from the background material for the longitudinal hole. The background material for the longitudinal hole is the material surrounding and forming the wall of the hole.

In an embodiment the pressure tube length section material and the background material for the longitudinal hole differs with respect to presence and/or amount of at least one dopant.

In an embodiment the pressure tube length section is of silica, preferably comprising an index-changing dopant and/or active material dopant.

In an embodiment the pressure tube length section is of F doped silica.

In an embodiment the pressure tube or at least the pressure tube length section of the pressure tube has an average outer diameter which is from about 50% up to 100% of an average inner diameter of the hole at the first preform end, such as from about 80% to about 99%, of said average inner diameter of said hole at the first preform end, such as at least about 90%, such as at least about 95% of the average diameter of the hole at the first preform end.

In an embodiment the pressure tube is in gas communication with a pressure source for controlling the pressure of the hole, more preferably the pressure tube is connected to a pressure supply at a supply opening, such as a supply opening at a second end of the pressure tube.

Advantageously the pressure tube has a supply section which is outside the hole i.e. the part of the pressure tube which leads from the hole to a gas connection to the pressure supply.

In an embodiment the supply section of the pressure tube has a supply opening which is in gas connection with a pressure source for controlling the pressure within the hole.

In an embodiment the supply section of the pressure tube has a supply opening which is within a pressure regulating chamber. By regulating the pressure within the pressure regulating chamber e.g. by the pressure source, the pressure within the pressure tube is also regulated and thereby the pressure within the longitudinal hole is regulated.

In an embodiment the supply section of the pressure tube has a supply opening which is directly connected to a pressure source for regulating the pressure within the pressure tube and thereby the pressure within the longitudinal hole is regulated.

In an embodiment the method comprises regulating the pressure in the pressure tube such that the pressure in the pressure tube is higher than a pressure acting on the outer side of the pressure tube. Thereby the relative diameter of the pressure controlled hole may expand during the drawing. Alternatively the pressure control is applied to maintain the relative hole diameter or to decrease the relative hole diameter of the pressure controlled hole during drawing.

The pressure tube can in principle be of any material. In an embodiment the pressure tube is of a thermo-moldable material, e.g. a material which may be molded or drawn at a fiber drawing tower. Advantageously the pressure tube is of silica optionally comprising a polymer coating. In an embodiment at least the supply section of the pressure tube has an outer polymer coating and optionally the pressure tube length section is free of polymer coating. The polymer coating increases the pliability of the pressure tube and reduces the risk of rupture of the pressure tube.

By providing the pressure tube of silica with a pressure tube length section with an uncoated pressure tube length section and a pressure tube supply section with a polymer coating, a desirably large hollow part cross-sectional diameter of the pressure tube may be obtained while at the same time the pressure tube supply section may be desirably pliable and rupture resistant.

As mentioned above several holes of the preform may be pressure-controlled with pressure tubes as described above. The pressure tubes may be connected to the same pressure supply or to different pressure supplies.

In an embodiment the preform comprises a plurality of longitudinal holes extending along its length and the method comprises inserting a first end of respective pressure tubes into each of a plurality of the holes of the preform at the first end of the preform and subjecting the hole of the preform to a controlled pressure via the pressure tubes during the drawing. Thereby each individual hole into which a pressure tube is inserted is subjected to a pressure control via said respective pressure tube. Thus the respective holes may be pressure controlled independently of each other. If desired some holes may be left without pressure control e.g. be left open to the atmospheric pressure.

Advantageously each of the respective pressure tubes is in gas communication with a pressure source for controlling the pressure of the holes.

In an embodiment each of the respective pressure tubes is in gas communication with a common pressure source for a common controlling of the pressure of the holes.

In an embodiment each of the respective pressure tubes is in gas communication with respective pressures source for individual or group wise controlling of the pressure of the holes. Thus for example a group of the pressure controlled holes may be pressure controlled by being in contact with a first pressure supply via pressure tubes and another group of the pressure controlled holes may be pressure controlled by being in contact with a first pressure supply via pressure tubes.

Advantageously the method comprises adjusting the respective pressures sources to provide the pressure control at respective pressures. Thereby the relative diameters of the holed may be modified during the drawing.

In an embodiment the drawing of the preform comprises drawing of the preform to the microstructured optical fiber in a drawing tower, wherein the preform is subjected to at least one pressure control at its first end section, preferably two or more independently controlled pressure controls at respective pressures.

In an embodiment the drawing of the preform comprising drawing the preform assembly from its second end section at an increase temperature.

Preferably the method comprises controlling each of one or more longitudinal holes of the preform extending along the length of the preform by arranging a pressure tube between the hole and a pressure supply. The pressure supply ensures that the pressure within the longitudinal hole extending along the length of the preform is controlled to a desired level via the pressure tube.

In an embodiment the method of the invention is provided for preparing an optical fiber comprising longitudinal holes of different cross-sectional diameters such as the fiber described in WO15144181. The method may thus be applied to ensure that the final fiber has holes with different cross-sectional diameters.

It has been found that the method of the invention may be beneficially applied for adjusting or correcting hole diameter (s) or a preform during drawing. For example if by mistake a hole in a preform was made with a smaller cross-sectional diameter than desired, this may be corrected during drawing by ensuring a higher pressure than would have been applied, had the cross-sectional diameter of the preform hole not been smaller than desired.

Further even where two set of holes having equal cross-sectional diameter in the preform, the resulting holes of the drawn fiber may have different cross-sectional diameter due to the individual pressure regulation of one or more holes during drawing according to an embodiment of the aspect.

In an embodiment the preform comprises a plurality of hollow tubes, such as capillary tubes fused together or to another part of the preform and the method comprises inserting a first end of respective pressure tubes into each of the hollow tubes of the preform at the first end of the preform and subjecting the hollow tubes to a controlled pressure via the pressure tubes during the drawing.

In an embodiment the preform comprises an outer cladding hollow tube and a plurality of inner cladding hollow tubes, wherein the inner cladding hollow tubes are arranged inside and fused to the outer cladding hollow tubes. Such preforms are advantageously applied for the production of hollow core anti-resonant fibers e.g. as described in WO15185761. In a preferred embodiment the preform is as described in co-pending application PCT/DK2016/050460 hereby incorporated by reference. The method advantageously comprises inserting a first end of respective pressure tubes into each of the inner cladding hollow tubes of the preform at the first end of the preform and subjecting the hollow tubes to a controlled pressure via the pressure tubes during the drawing.

In an embodiment the inner cladding hollow tubes are not touching each other. The inner cladding hollow tubes preferably comprise 5, 6, 7 or 8 inner cladding tubes.

In an embodiment the preform is a preform assembly obtained from assembling a preform center element with a length and a first and a second end and at least one preform ring element with a ring shaped wall, and arranging the ring shaped wall to surround the preform center element to form a ring wall preform center interface, wherein the preform assembly has a first end section comprising the first end of the preform center element and the first end of the ring shaped wall. Such a preform assembly is described in detail in co-pending application PCT/DK2016/050460 hereby incorporated by reference. In an embodiment the preform assembly preferably comprises an overcladding tube with a length and a first and a second end and a bore where the ring shaped ring wall is inside the bore of the overcladding tube to form a ring wall overcladding tube interface, wherein the preform assembly has a first end section comprising the first end of the preform center element, the first end of the preform ring element and the first end of the overcladding tube.

Advantageously the method comprises subjecting at least one of the of the ring wall preform center interface and the ring wall overcladding tube interface to a reduced pressure during at least a part of the drawing.

In an embodiment the preform center element comprises the at least one longitudinal hole and the method comprises inserting the first end of the pressure tube into the hole of the preform center element and subjecting the hole of the preform center element to a preform center controlled pressure via the pressure tube during the drawing.

In an embodiment the at least one longitudinal hole comprises at least a first category hole and at least a second category hole extending in length of the preform center element, the method comprising subjecting the at least one first category hole to a first preform center controlled pressure and subjecting the at least one second category hole to a second preform center controlled pressure during the drawing.

In an embodiment the preform ring element comprises at least one hollow tube with a hole and/or at least one interspace hole extending in length direction of the preform ring element, the method comprising subjecting the at least one hole of the preform ring element to a preform ring element controlled pressure during the drawing, preferably the preform ring element controlled pressure is controlled.

All features of the inventions and embodiments of the invention as described above including ranges and preferred ranges can be combined in various ways within the scope of the invention, unless there are specific reasons not to combine such features.

BRIEF DESCRIPTION OF THE DRAWINGS

The above and/or additional objects, features and advantages of the present invention will be further elucidated by the following illustrative and non-limiting description of embodiments of the present invention, with reference to the appended drawings.

The figures are schematic and may be simplified for clarity. Throughout, the same reference numerals are used for identical or corresponding parts.

Further scope of applicability of the present invention will become apparent from the description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
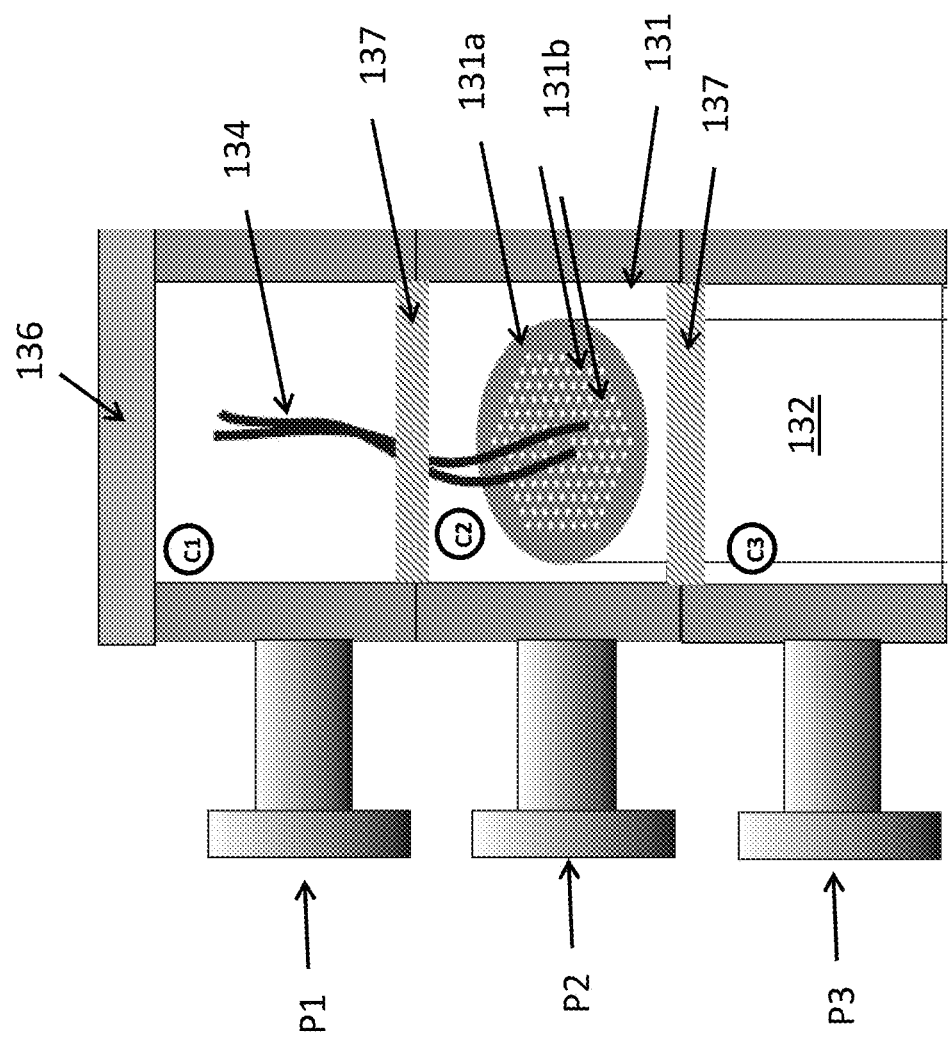
FIG. 1 illustrates a pressure control arrangement of a fiber drawing tower and a part of a preform ready for being drawn to an optical fiber.

FIG. 1 shows a pressure control arrangement comprising a pressure control cap 136 with a pressurization arrangement comprising from top and downwards a first, a second, and a third chamber C1, C2, C3 and with corresponding pressure tube connections P1, P2 and P3. The pressure control cap 136 may have further chambers and corresponding pressure tube connections, if desired e.g. as described in co-pending application PCT/DK2016/050364. The pressure tube connections P1, P2 and P3 may be connected directly or indirectly e.g. with not shown connectors to individual or common pressure supply units for controlling the pressure in the respective chambers, preferably individually from each other.

A preform 131 a preform e.g. as described above and/or in co-pending application PCT/DK2016/050364 is held in the pressure control cap 136, such that a part comprising the first end 131a of the preform 131 is arranged in the second chamber C2 and a part 132 of the preform 131 at a distance from its first end 131a is arranged in the third chamber C3. The pressure control cap 136 is sealed to a not shown overcladding surrounding the preform 131 to seal off the lowermost chamber, which in the exemplified embodiment is the third chamber. Where the preform 131 is a preform center element, the pressure control arrangement preferably comprises one or more additional chambers for control of holes in the ring element(s) as described above and/or in co-pending application PCT/DK2016/050364.

The preform 131 comprises a number of secondary holes 131b which terminate at the first end 131a of the preform 131 such that they are in gas communication with the second chamber C2. A number of primary holes of the preform 131 are in gas communication with the first chamber C1 via pressure tubes 134. The secondary holes and the primary holes may be equal or different. The pressure tubes 134—here illustrated with two pressure tubes 134 for simplification—are partly inserted into the primary holes such that a pressure tube length section comprising a first end of the respective pressure tubes 134 are inserted into respective holes.

Seals 137 are provided for sealing off the chambers C1, C2 and C3 from each other.

During drawing the pressure in the three chambers C1, C2, C3 are controlled via the corresponding pressure tube connections P1, P2 and P3.

Advantageously the pressure in the third chamber is relatively low, e.g. near vacuum to ensure that the overcladding or an optional ring element surrounding the preform 131 seals tightly onto the preform 131 and preferably fuses to the preform 131. The pressure in the first and the second chambers C1, C2 is advantageously controlled such that the primary holes and the secondary holes 131b of the preform results in holes in the fibers with different cross-section. For example the pressure in the first chamber C1 may be higher than the pressure in the second chamber C2.

Many other configurations may be applied to provide individual control of respective holes and/or interfaces.

Figure 2:
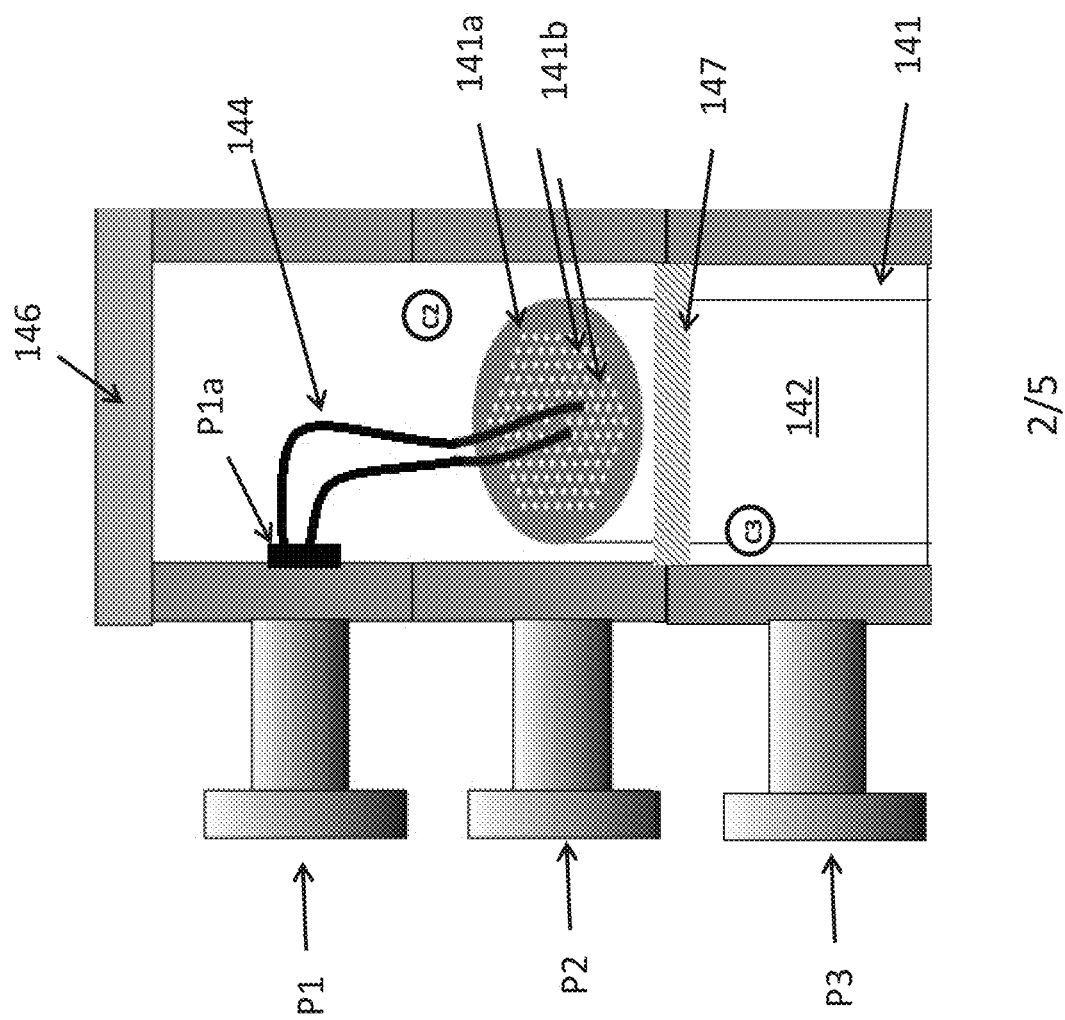
FIG. 2 illustrates another pressure control arrangement of a fiber drawing tower and a part of a preform ready for being drawn to an optical fiber.

FIG. 2 is a variation of the embodiment shown in FIG. 1.

FIG. 2 shows a pressure control arrangement comprising a pressure control cap 146 with a pressurization arrangement comprising from top and downwards a common first and second chamber C2 and a third chamber C3. Compared to the embodiment of FIG. 1 the first and second chambers are combined to a common second chamber C2. Two pressure tube connections P1 and P2 are connected to the common chamber C2 and a pressure tube connection P3 is connected to the third chamber C3.

A preform 141 which may be as the preform 131 as shown in FIG. 1 is held in the pressure control cap 146, such that a part comprising the first end 141a of the preform 131 is arranged in the common chamber C2 and a part 142 of the preform 141 at a distance from its first end 141a is arranged in the third chamber C3.

The pressure control cap 146 is sealed to a not shown overcladding surrounding the preform 141 to seal off the lowermost chamber, which in the exemplified embodiment is the third chamber e.g. as described for the embodiment of FIG. 1.

The preform 141 comprises a number of secondary holes 141b which terminate at the first end 141a of the preform 141 such that they are in gas communication with the second chamber C2. A number of primary holes of the preform 141 are in gas communication directly with the pressure tube connection P1 via pressure tubes 144. A seal P1a are arranged to seal off the first pressure tube connection P1 from the common chamber C2, Thereby the pressure in the common chamber C2 is pressure controllable via the second pressure tube connection only.

The pressure tubes 144—here illustrated with two pressure tubes 144 for simplification—are partly inserted into the primary holes such that a pressure tube length section comprising a first end of the respective pressure tubes 144 are inserted into respective holes.

Seals 147 are provided for sealing off the common chamber C2 from the third chamber C3.

During drawing the pressure in two chambers C2, C3 are controlled via the corresponding pressure tube connections P2 and P3 and the pressure in the pressure tube in gas communication with the primary holes are controlled via the pressure tube connections P1.

Figure 3:
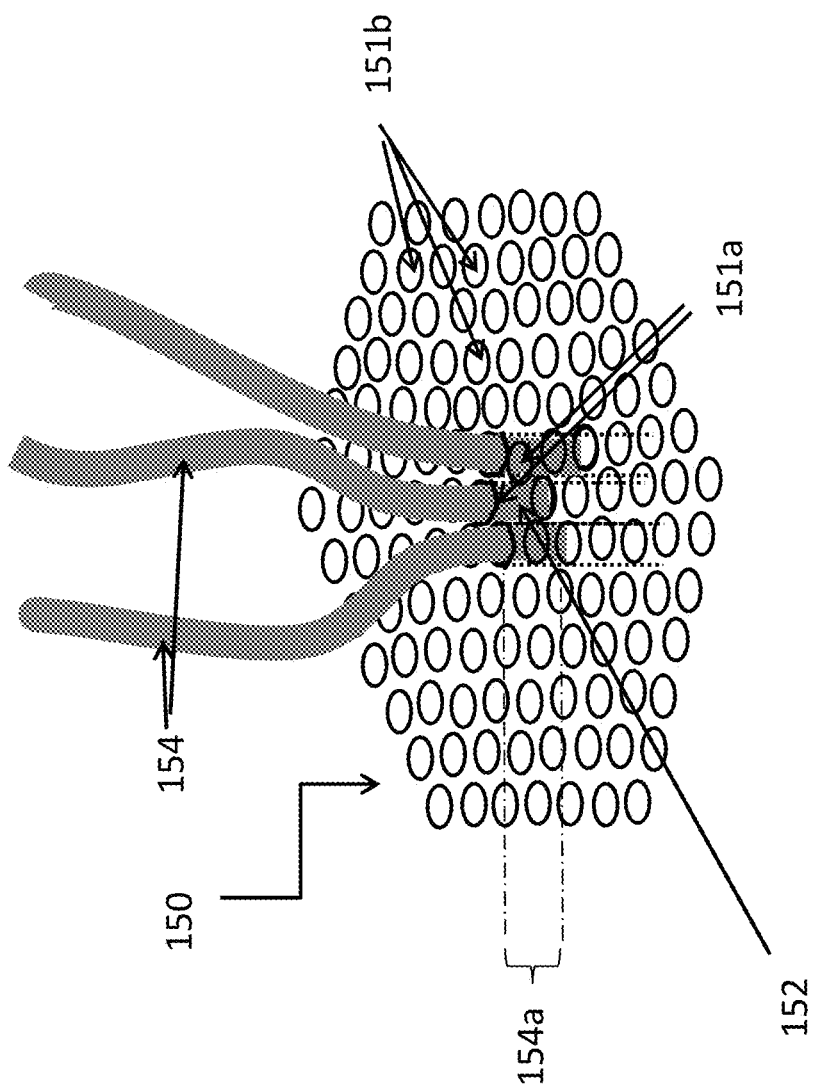
FIG. 3 illustrates a first end of a preform with a plurality of longitudinal holes and where the first ends of the respective pressure tubes are inserted into the respective holes for pressure controlling of the holes during drawing.

The preform shown in FIG. 3 comprises a plurality of longitudinal holes 151a,151b. Only the first end (end-facet) 150 of the preform is shown. An innermost ring of holes 151a (primary holes), defines a preform core 152. The remaining holes 151b (secondary holes) are arranged in rings encircling the innermost ring of holes 151a. Pressure tubes 154 are arranged to connect each of the primary holes 151a to a pressure supply for controlling the pressure within the primary holes 151a during drawing. For simplification only three of the pressure tubes 154 are shown. A pressure tube length section 154a inserted in the hole of each pressure tube is advantageously uncoated silica, whereas the remaining part of the pressure tube 154, referred to as the pressure tube supply section is polymer coated silica. The pressure in the secondary holes may advantageously be controlled in a pressure chamber such as shown in FIGS. 1 and 2.

During drawing the pressure in respectively the primary and the secondary holes 151a, 151b, may advantageously be controlled such that the primary holes 151a in the drawn optical fiber have larger cross-sectional diameter than the secondary holes 151b.

Figure 4:
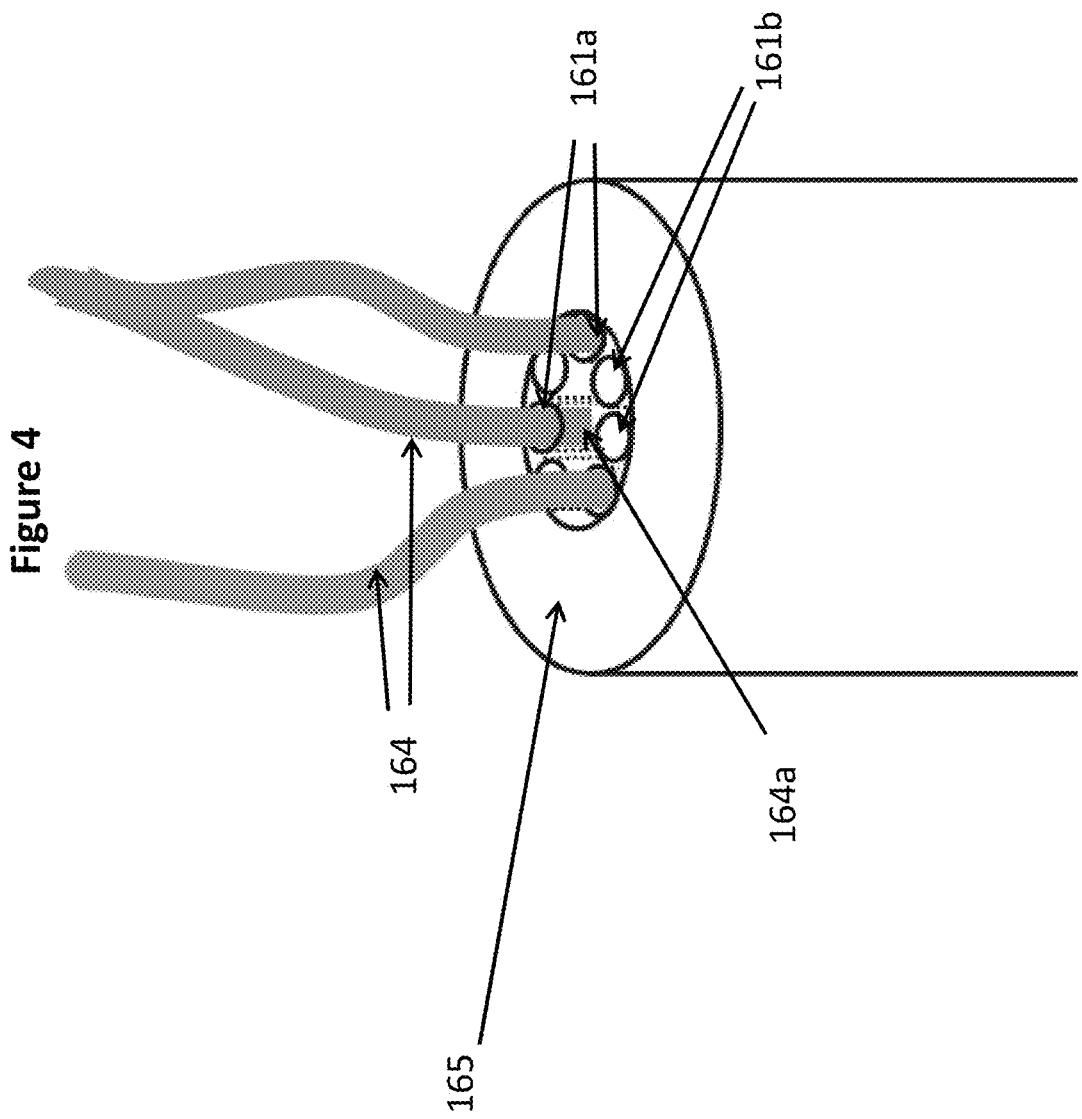
FIG. 4 illustrates a first end of another preform with a plurality of longitudinal holes and where the first ends of the respective pressure tubes are inserted into the respective holes for pressure controlling of the holes during drawing.

The preform shown in FIG. 4 is advantageously a preform for a hollow core fiber as described in PCT/DK2016/050460.

The preform comprises a preform outer cladding region 165 and 7 hollow preform tubes 161a, 161b arranged in a non-touching ring (i.e. the tubes are not touching each other) surrounded by and fused to the preform outer cladding region 165.

The pressure tubes 164 are arranged to connect each of three of the preform tubes 161a (primary hollow tubes) to a not shown pressure supply for control of the pressure in the primary hollow tubes 161a during drawing. A pressure tube length section 164a inserted into the hole of each primary hollow tubes 161a is advantageously uncoated silica, whereas the remaining part of the pressure tube 164, referred to as the pressure tube supply section is polymer coated silica. The pressure in the secondary hollow tubes 161b may advantageously be controlled in a pressure chamber such as shown in FIGS. 1 and 2.

Figure 5:
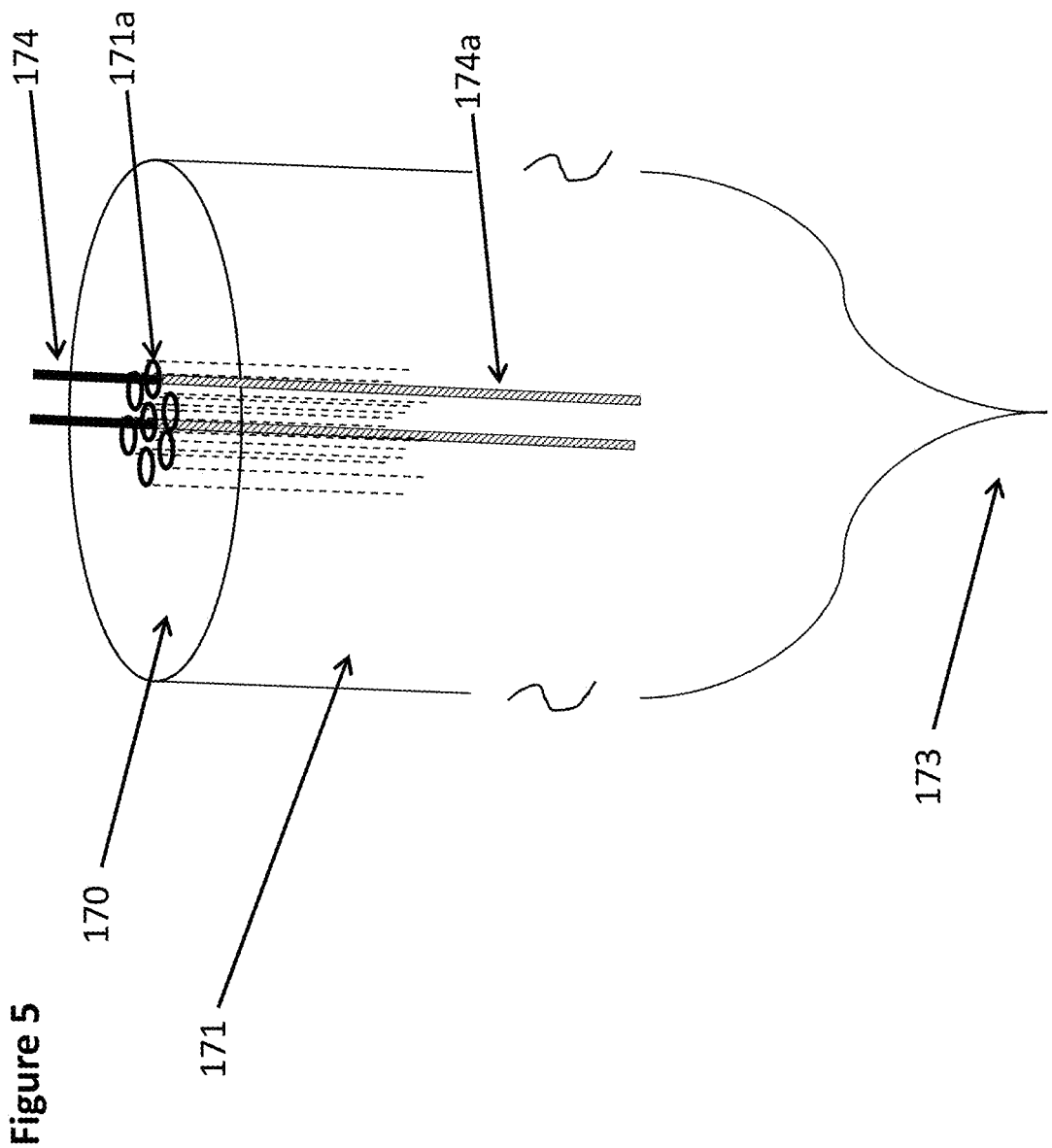
FIG. 5 illustrates an embodiment comprising a first end and second end of a preform about to be drawn.

The preform 171 shown in FIG. 5 comprises a first end 170 and a second end 173 wherein the second end 173 of the preform is tapered to be ready for being drawn to a fiber. The "⊋" signs indicate that the preform may have any length.

The preform 171 comprises a plurality of longitudinal holes 171a. Pressure tubes 174 are inserted into the holes—for the illustration only two pressure tubes 174 are shown, but it should be understood that pressure tubes may be inserted into each of the holes 171a. The pressure tube length sections 174a inserted into the holes extends sufficiently long into the holes, e.g. substantially in the entire length of the holes, so that the material of the pressure tube length section will be drawn to become part of the fiber.

When the drawing is initiated and an increased pressure is applied it the holes 171a via the pressure tubes 174, the pressure tubes will initially expand to the size of the holes 171 and thereby the pressure in the holes 171a may be controlled during the drawing.

The invention claimed is:

1. A method of producing a hollow core microstructured optical fiber, the method comprising:
providing a preform with a center axis, a length, a first end, and a second end, wherein the preform comprises a plurality of hollow tubes;
inserting a first end of a pressure tube into each of a sub-set of the plurality of hollow tubes of the preform at the first end of the preform; and
drawing the preform to the hollow core microstructured optical fiber, said drawing comprising subjecting the sub-set of the plurality of hollow tubes of the preform to a controlled pressure via the pressure tubes,
wherein a pressure tube length section comprising the first end of each said respective pressure tube is inserted into each hollow tube of the sub-set of the plurality of hollow tubes of said preform, wherein the hollow core microstructured optical fiber comprises at least a part of the pressure tube length section.

2. The method of claim 1, wherein the preform further comprises an outer cladding hollow tube.

3. The method of claim 2, wherein the outer cladding hollow tube comprises an outer cladding region.

4. The method of claim 3, wherein the plurality of hollow tubes are inner cladding hollow tubes arranged inside and fused to the outer cladding region.

5. The method of claim 1, wherein each pressure tube length section is about 50% or less of an entire length of each respective pressure tube.

6. The method of claim 1, wherein the sub-set of plurality of hollow tubes each have a length and each pressure tube length section has a length of at least about 50% of the length of each respective hollow tube.

7. The method of claim 1, wherein the method comprises inserting each respective pressure tube length section into each hollow tube of the sub-set of the plurality of hollow tubes of the preform and wherein a material comprising each pressure tube length section also comprises a part of the preform.

8. The method of claim 1, wherein each of the pressure tubes or each of the pressure tube length section of the pressure tubes has an average outer diameter between about 50% to 100% of an average inner diameter of the respective hollow tube of the sub-set of the plurality of hollow tubes at said first end of the preform.

9. The method of claim 1, wherein each of the pressure tubes have a supply section which is outside the respective hollow tube of the sub-set of the plurality of hollow tubes, wherein the pressure tubes are made of silica, and wherein at least the supply section of the pressure tubes has an outer polymer coating.

10. The method of claim 1, further comprising regulating the controlled pressure in each of the pressure tubes such that the pressure tubes are self-sealing to the sub-set of the plurality of hollow tubes of the preform.

11. The method of claim 1, wherein the plurality of hollow tubes comprises 5, 6, 7 or 8 hollow tubes.

12. The method of claim 1, wherein the plurality of hollow tubes are open at the first end of the preform for facilitating insertion of the first ends of the pressure tubes into the plurality of hollow tubes.

13. The method of claim 1, wherein the preform is a solid tube except for the plurality of hollow tubes.

* * * * *